Jan. 1, 1952
W. MAJEWSKI
2,581,267
FACE POWDER DISPENSING RECEPTACLE
Filed March 3, 1947
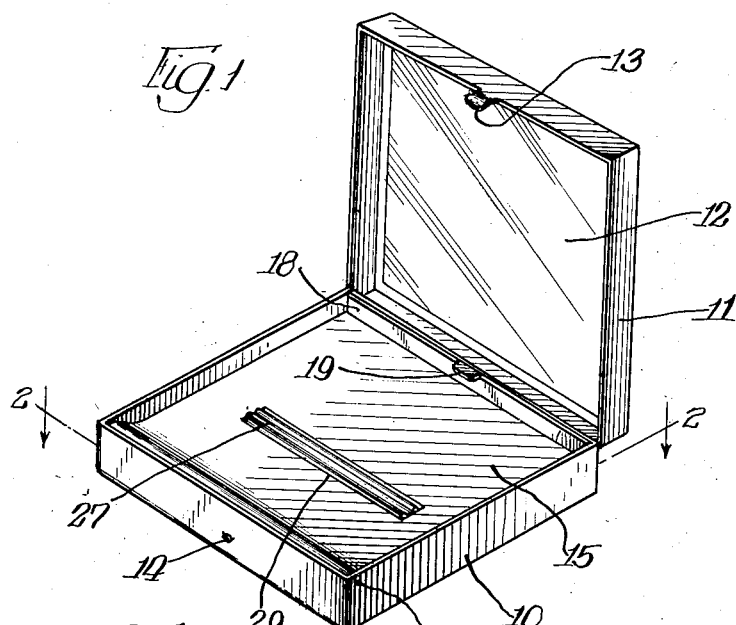
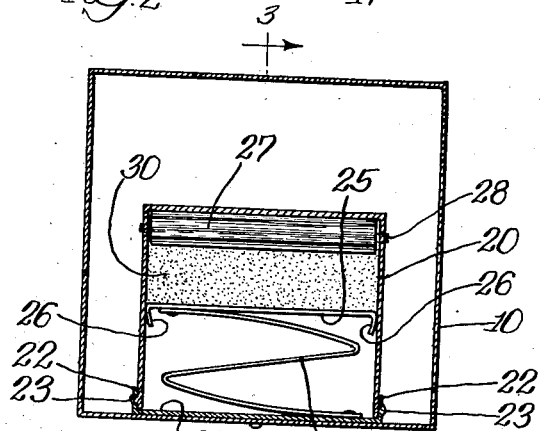
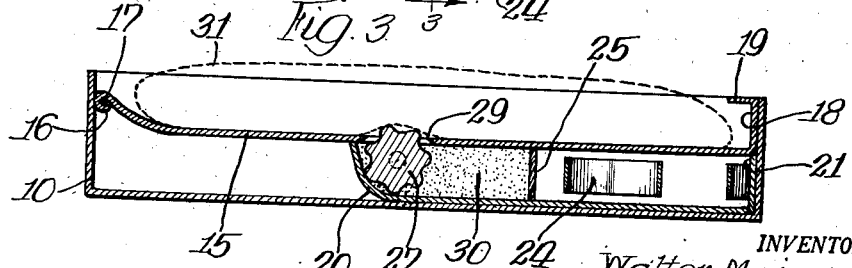
INVENTOR.
Walter Majewski,
BY Patented Jan. 1, 1952

2,581,267

UNITED STATES PATENT OFFICE 2,581,267

FACE POWDER DISPENSING RECEPTACLE

Walter Majewski, Norwood Park, Ill.

Application March 3, 1947, Serial No. 732,021

3 Claims. (Cl. 222—205)

The present invention relates to receptacles, such as compact or the like, from which face powder may be dispensed in small quantities at a time, to be picked up by a powder puff.

A still further object of the present invention is the provision of a receptacle wherein face powder may be maintained under pressure, with means for bringing out of the receptacle small quantities of the powder, and such as are desired at any given time to be picked up by powder puff.

A still further object of the present invention is the provision of a toothed wheel, partly embedded within the powder mass in the receptacle, and partly extended outwardly therefrom, and which wheel may bring out of the receptacle any predetermined quantity of powder when a rotary movement is imparted to the wheel.

With the above general objects in view and others that will appear as the invention is better understood, the same consists in the novel construction, combination and arrangement of parts hereinafter more fully described, illustrated in the accompanying drawing and pointed out in the appended claims.

In the drawings forming a part of this application, and in which like designating characters refer to corresponding parts throughout the several views:

Fig. 1 is a perspective view of a casing, such as a compact, with the cover thereof in an open position;

Fig. 2 is a cross-sectional view therethrough, on a horizontal plane, the view having been taken on line 2—2 of Fig. 1; and Fig. 3 is an enlarged cross-sectional view through the casing, on line 3—3 of Fig. 2, with cover removed.

Referring in detail to the present drawing there is shown therein casing 10, which may be made in a rectangular, square, as shown, or any other desired form. The casing is provided with cover 11, which is hinged to one side of casing 10, and which on its inner, horizontal face may be provided with mirror 12. On its side wall, oppositely disposed from the hinge, said cover 11 is provided with lip 13, which engages the outwardly pressed indent 14 made in the corresponding side wall of casing 10, for maintaining cover 11 in a closed position with respect to casing 10.

Positioned within the side walls of casing 10 is partition 15, which divides casing 10 into two substantially equal sections, one disposed over the other, as is clearly seen in Fig. 3. One end of said partition 15 is raised and formed into roll 16 which receives pin 17, the latter extended through a pair of oppositely disposed side walls of casing 10. Roll 16 and pin 17 form a hinge upon which partition 15 may be angularly shifted. Said hinge preferably is positioned at the side of casing 10, which is oppositely disposed to the side to which cover 11 is hinged.

The opposite end of partition 15 is provided with an upturned wall 18 which contacts the inner face of the adjacent side wall of casing 10, and thereby maintains partition 15 in a closed position within casing 10, as seen in Fig. 3. Extending from said wall 18, in a horizontal direction is lip 19 which may be manually engaged for shifting partition 15 upon its hinge 16—17 and out of casing 10.

Affixed to the lower face of partition 15 is housing 20, the inner end of which terminates substantially centrally of said partition 15. The mouth of housing 20, disposed below the free end of partition 15 receives closure 21, which at each of its ends is provided with leaf 22. Each leaf 22 is provided with indent 23 for engaging the corresponding indent made in each side wall of housing 20, as is seen in Fig. 2. Closure 21 and leaves 22 are made of resilient metal, so that the same may be placed over the mouth of housing 20, or removed therefrom without difficulty. Normally, when partition 15 remains within casing 10, as seen in Fig. 3, closure 21 contacts the adjacent side wall of casing 10.

Leaf spring 24 is attached by one of its ends to the inner face of closure 21, and by its opposite end to compression plate 25. Said plate 25 is in a transverse relation with housing 20, and contacts the inner faces of the walls thereof, as well as the lower face of partition 15, as is seen in Fig. 3; and is adapted for longitudinal movement in housing 20.

The ends of said plate 25 are bent for defining guides 26, which contact the side walls of housing 20 and facilitate the insertion of plate 25 within housing 20 and provide guiding means during the shifting movement of said plate 25 within housing 20. Said spring 24 remains compressed, urging plate 25 toward the inner end of housing 20.

Positioned within the inner end of housing 20 is a peripherally ribbed roller 27, which is journaled upon pins 28 which are mounted for rotary movement within the side walls of housing 20. Partition 15 is provided with an opening 29, through which said roller 27 partially extends through and above partition 15.

From the hereinabove description it will be seen that on manual engagement and upward pulling at lip 19 partition 15 and housing 20 are angularly swung upon hinge 16—17 out of casing 10, assuming of course that cover 11 remains in an open position. Thereupon closure 21 is pulled out from the mouth of housing 20 by manual disengagement of leaves 22 from side walls of housing 20. When closure 21 is removed, spring 24 and plate 25 will likewise be removed from said housing 20, because closure 21 and plate 25 are connected by spring 24. Thereupon quantity of powder 30 may be poured into housing 20 through its open mouth. When plate 25 and closure 21 are replaced, due to the pressure exerted by plate 25 by the action of spring 24, powder remaining within housing 20 will become compressed and compacted against roller 27. Imparting of rotary motion to wheel 23, by manually engaging portion thereof which extends above partition 15, will cause portion of roller 27, which theretofore remained embedded in powder 30, to shift above partition 15. Any powder which impinged itself between the several recesses between the teeth or ribs on the roller 27, will necessarily be bought by said roller above partition 15. Application of mopping action of powder puff 31 at the portion of roller 27 remaining above partition 15 and at the adjacent area of partition 15, will transfer the powder there remaining to the powder puff.

When partition 15 remains in a closed, operative position within casing 10, shown in Fig. 3, the section of casing 10 above said partition 15 constitutes a compartment within which powder puff 31 may normally be stored when cover 11 is closed.

When said partition 15 is in that operative position within casing 10, the bottom wall of housing 20 contacts with the bottom wall of casing 10, thereby preventing further angular shifting movement of partition 15 within casing 10.

The space within the section below partition 15, not occupied by housing 20, constitutes a compartment within which lipstick, rouge, cigarettes or matches may be kept.

It is further observed that the edges of the body portion of partition 15 effected by opening 29 are in close proximity to the apexes of the teeth or ribs on the roller 27. Therefore, as said roller 27 is rotated, said edges act as brushes to brush off all powder from roller 27 except the quantities thereof remaining between the ribs or teeth of the roller 27. By this means the quantity of powder brought up by the ribs on the roller 27 is regulated.

While there is described herein a preferred embodiment of the present invention, it is nevertheless to be understood that minor changes may be made therein without departing from the spirit and scope of the invention as claimed.

What I claim as new is:

1. A face powder dispensing device comprising a case, a partition having an opening therein hingably positioned within said case, a receptacle adapted to receive a quantity of powder affixed to said partition, a ribbed roller carried by said receptacle and positioned so as to extend partially into the opening in the partition, the bottom wall of said receptacle being rounded at one end to form an adjoining wall thereof and said ribbed roller being positioned in close proximity thereto whereby the ribs of said roller make a brushing contact with a part of said curved section, and means in said receptacle for maintaining a powder therein in a compacted contactual relation with said ribbed roller, said means including a closure for said receptacle, a spring affixed at one end thereto, and a plate affixed to the opposite end of the spring and urged thereby toward said roller.

2. A face powder dispensing device comprising a casing, a partition hingedly affixed to one side wall of said casing, said partition dividing said casing into a pair of housings of substantially equal depth, a receptacle rigidly affixed to the bottom face of said partition, in the operative position of said partition within said casing said receptacle contacting with the bottom wall of said casing, said partition being provided with an opening, a ribbed roller positioned within said receptacle and journalled within the side walls thereof for rotary movement, a portion of the periphery of said roller extending through said opening and projecting above said partition, said receptacle being provided with a mouth for receiving therethrough a quantity of powder in contact with said roller, the ribs of said roller being in contact with the body portion of said partition adjacent said opening for brushing off any powder adhering to said ribs during the rotation of said roller, and means extensible through said mouth for maintaining the powder within said receptacle in a compacted contactual relation with said roller.

3. A face powder dispensing device comprising a casing, a partition hingedly affixed to one side wall of said casing, said partition dividing said casing into a pair of housings of substantially equal depth, a receptacle rigidly affixed to the bottom face of said partition, in the operative position of said partition within said casing said receptacle contacting with the bottom wall of said casing, said partition being provided with an opening, a ribbed roller positioned within said receptacle and journalled within the side wall thereof for rotary movement, a portion of the periphery of said roller extending through said opening and projecting above said partition, said receptacle being provided with a mouth for receiving therethrough a quantity of powder in contact with said roller, the ribs of said roller being in contact with the body portion of said partition adjacent said opening for brushing off any powder adhering to said ribs during the rotation of said roller, and means extensible through said mouth for maintaining the powder within said receptacle in a compacted contactual relation with said roller, said means including a closure receivable within the mouth of said receptacle, a spring affixed thereto, and a plate having inturned ends in sliding engagement with the side walls of said receptacle, said plate being carried by said spring and urged thereby toward said roller.

WALTER MAJEWSKI.

REFERENCES CITED

The following references are of record in the file of this patent:

UNITED STATES PATENTS

| Number | Name | Date |
|---|---|---|
| 1,860,694 | Shield | May 31, 1932 |
| 2,147,929 | Segal | Feb. 21, 1939 |
| 2,147,930 | Segal | Feb. 21, 1939 |

FOREIGN PATENTS

| Number | Country | Date |
|---|---|---|
| 684,402 | France | Mar. 17, 1930 |